United States Patent
Goto et al.

(10) Patent No.: US 11,206,186 B2
(45) Date of Patent: Dec. 21, 2021

(54) MEASUREMENT APPARATUS AND MEASUREMENT METHOD

(71) Applicant: ANRITSU CORPORATION, Kanagawa (JP)

(72) Inventors: Yoshihide Goto, Kanagawa (JP); Akihisa Kumaki, Kanagawa (JP); Takashi Nakano, Kanagawa (JP)

(73) Assignee: ANRITSU CORPORATION, Kanagawa (JP)

(*) Notice: Subject to any disclaimer, the term of this patent is extended or adjusted under 35 U.S.C. 154(b) by 74 days.

(21) Appl. No.: 16/916,634

(22) Filed: Jun. 30, 2020

(65) Prior Publication Data
US 2021/0006460 A1    Jan. 7, 2021

(30) Foreign Application Priority Data

Jul. 4, 2019    (JP) .............................. JP2019-125230

(51) Int. Cl.
*H04L 12/24* (2006.01)
*H04B 17/29* (2015.01)
*H04B 17/15* (2015.01)

(52) U.S. Cl.
CPC .......... *H04L 41/085* (2013.01); *H04B 17/15* (2015.01); *H04B 17/29* (2015.01)

(58) Field of Classification Search
CPC .................................................. H04L 41/085
See application file for complete search history.

(56) References Cited

U.S. PATENT DOCUMENTS

| | | | | |
|---|---|---|---|---|
| 9,854,467 | B2* | 12/2017 | Burns | H04W 4/80 |
| 2005/0031344 | A1* | 2/2005 | Sato | B60R 1/12 |
| | | | | 398/42 |
| 2012/0196534 | A1* | 8/2012 | Kasslin | H04W 4/06 |
| | | | | 455/41.2 |
| 2017/0245285 | A1* | 8/2017 | Palin | H04W 28/0236 |
| 2020/0008085 | A1* | 1/2020 | Chakraborty | H04W 52/00 |
| 2020/0146097 | A1* | 5/2020 | Haartsen | H04W 76/28 |

FOREIGN PATENT DOCUMENTS

JP        2018-164214 A    10/2018

* cited by examiner

*Primary Examiner* — Hsinchun Liao
(74) *Attorney, Agent, or Firm* — Pearne & Gordon LLP (57) ABSTRACT

There is provided a measurement apparatus and a measurement method capable of easily performing measurement on a DUT by automatically specifying a Bluetooth (registered trademark) core specification version supported by the DUT. A command packet corresponding to the highest Bluetooth core specification version is transmitted to the DUT, in a case where an event including an error response is returned from the DUT, a command packet corresponding to the next lower Bluetooth core specification version than the command packet of the returned event continuously transmitted to the DUT, in a case where an event not including an error response is returned from the DUT, the Bluetooth core specification version of the command packet of the returned event is specified as the Bluetooth core specification version supported by the DUT, and measurement is performed on the DUT by using the command packet corresponding to the specified Bluetooth core specification version.

16 Claims, 5 Drawing Sheets

| Bluetooth core specification version | Test command version | Parameter group A | Parameter group B | Parameter group C |
|---|---|---|---|---|
| 4.x | [v1] | Support | No setting | No setting |
| 5.0 | [v2] | Support | Support | No setting |
| 5.1 | [v3] | Support | Support | Support |

HCI Command

FIG. 5A

| Bluetooth core specification version | Parameter group A | Parameter group B | Parameter group C |
|---|---|---|---|
| 4.x | Support | No setting | No setting |
| 5.0 | Support | Support | No setting |
| 5.1 | Support | Support | Support |

Direct test mode

FIG. 5B

MEASUREMENT APPARATUS AND MEASUREMENT METHOD

TECHNICAL FIELD

The present invention relates to a measurement apparatus and a measurement method which measure transmission and reception characteristics of a device under test operating based on a Bluetooth (registered trademark) standard.

BACKGROUND ART

In recent years, many wireless communication apparatuses such as a smartphone which can be used in a wireless communication network such as a wireless LAN or a wireless PAN and the like have been manufactured. Further, a measurement apparatus which measures transmission and reception characteristics of a wireless communication apparatus while performing simulated wireless communication with such a wireless communication apparatus is known (for example, see Patent Document 1).

As a communication standard related to a technology of the wireless PAN, for example, the Bluetooth standard is known. The Bluetooth standard also defines a DUT control specification for a Bluetooth device which is a device under test (DUT). A communication mode of the Bluetooth includes a Basic Rate (BR)/Enhanced Data Rate (EDR) in the related art and new Bluetooth low energy (BLE).

A core standard of the Bluetooth to which BLE is added includes three types of Bluetooth core specification version 4.x (4.0, 4.1, and 4.2), 5.0, and 5.1. In addition, each time Bluetooth core specification version is 4.x→5.0→5.1, a test command for test control of the DUT in which setting parameters are increased is added. The test command and the parameter are transmitted to the DUT in a form included in a command packet. Further, a control mode for test control of the BLE includes a mode in which an HCI command is used and a mode in which a direct test mode is used.

Figure 5A:
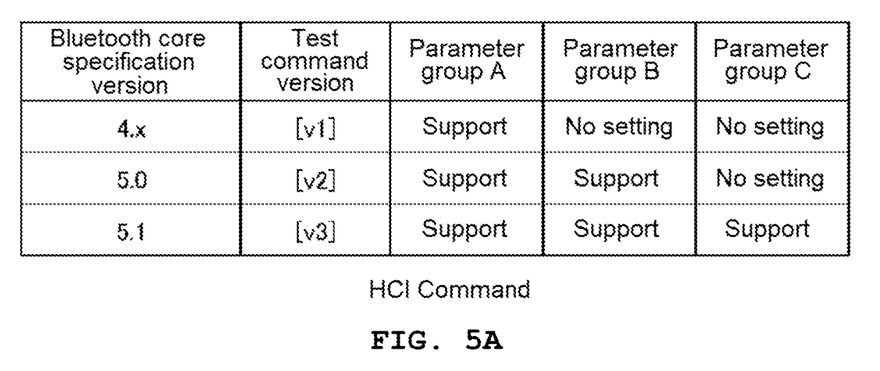
FIG. 5A is a table illustrating a parameter group which can be set for each Bluetooth core specification version in a control mode in which an HCI command is used.

FIG. 5A illustrates parameter groups which can be set (supported) in versions [v1], [v2], and [v3] of a test command corresponding to each Bluetooth core specification version in the control mode in which the HCI command is used.

A parameter group A is a parameter group set in Bluetooth core specification version 4.x, and includes a parameter for setting a center frequency of an RF channel used for communication, a payload length of a packet for test, or the like. A parameter group B is a parameter group added in Bluetooth core specification version 5.0, and includes parameters for setting a communication speed, a reach distance, or the like. A parameter group C is a parameter group added in Bluetooth core specification version 5.1, and includes a parameter for performing setting related to direction finding.

As illustrated in FIG. 5A, the test command version [v1] of Bluetooth core specification version 4.x supports only the parameter group A. The test command version [v2] of Bluetooth core specification version 5.0 supports the parameter group A and the parameter group B. The test command version [v3] of Bluetooth core specification version 5.1 supports the parameter group A, the parameter group B, and the parameter group C. That is, the higher Bluetooth core specification version also supports the lower test command.

Figure 5B:
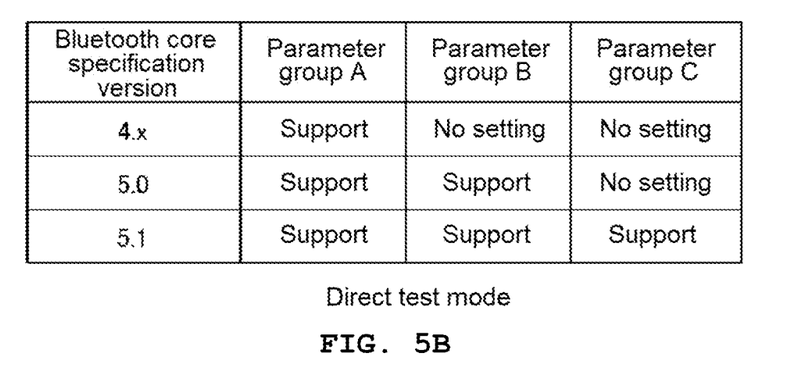
FIG. 5B is a table illustrating a parameter group which can be set for each Bluetooth core specification version in a control mode in which a direct test mode is used.

FIG. 5B illustrates parameter groups which can be set (supported) in each Bluetooth core specification version in the control mode in which the direct test mode is used. In the direct test mode, a common test command is used for all of Bluetooth core specification versions 4.x, 5.0, and 5.1. Types of parameters respectively included in parameter groups A, B, and C or a support relationship for each Bluetooth core specification version of the parameter groups A, B, and C are described in the same manner as in the control mode in which the HCI command illustrated in FIG. 5A is used.

RELATED ART DOCUMENT

[Patent Document]
    [Patent Document 1] JP-A-2018-164214

DISCLOSURE OF THE INVENTION

Problem that the Invention is to Solve

However, there are locations at which compatibility between Bluetooth core specification versions 4.x, 5.0, and 5.1 of the BLE is not considered. For this reason, the following problems may occur in the measurement apparatus in the related art as disclosed in Patent Document 1. For example, in a case where after using a command packet including a test command and a parameter group for a Bluetooth core specification version 5.0 for a DUT having Bluetooth core specification version 5.0, a command packet for a Bluetooth core specification version 4.x is used for the same DUT, a desired value cannot be set in the parameter group B. In such a case, the DUT may not operate as expected.

In addition, a way to know which of Bluetooth core specification versions 4.x, 5.0, and 5.1 is supported by the DUT itself is not clearly prepared in the measurement apparatus. For this reason, for example, there is a problem that the DUT corresponding to Bluetooth core specification version 4.x cannot be controlled even if the DUT is controlled by a command packet used in Bluetooth core specification version 5.1.

For this reason, in the measurement apparatus in the related art, there is a problem that a user has to check a Bluetooth core specification version supported by the DUT in advance, and manually select a test command and a parameter group corresponding to Bluetooth core specification version. In particular, it is difficult for the user who is not an expert to determine what to select.

The present invention is made to solve such problems in the related art, and it is an object of the present invention to provide a measurement apparatus and a measurement method capable of automatically specifying a Bluetooth core specification version supported by a device under test (DUT) and easily performing measurement on the DUT by using a command packet corresponding to the specified Bluetooth core specification version.

Means for Solving the Problem

According to a first aspect of the present invention for solving the problem, there is provided a measurement apparatus including a command packet transmission and reception unit that transmits a command packet corresponding to any one of a plurality of Bluetooth (registered trademark) core specification versions to a device under test (DUT) and receives an event indicating that the command packet is received from the DUT and measuring a transmission and reception characteristic of the DUT, the apparatus including: an error response determination unit that determines whether or not the event received from the DUT includes an error response; a Bluetooth core specification version specifying unit that specifies a Bluetooth core specification version supported by the DUT based on a determination result of the error response determination unit; and a measurement execution unit that causes the command packet transmission and reception unit to transmit a command packet corresponding to the Bluetooth core specification version specified by the Bluetooth core specification version specifying unit to the DUT, and measures an RF signal transmitted and received by the DUT to measure a transmission and reception characteristic of the DUT, in which the error response indicates that the command packet transmitted from the command packet transmission and reception unit is a command packet which does not correspond to the Bluetooth core specification version supported by the DUT, the command packet transmission and reception unit transmits a command packet corresponding to a highest Bluetooth core specification version among the plurality of Bluetooth core specification versions to the DUT, at the time of measurement start, in a case where the error response determination unit determines that the event including the error response is returned from the DUT, the command packet transmission and reception unit further transmits a command packet corresponding to the next lower Bluetooth core specification version than the command packet of the returned event including the error response to the DUT, and in a case where the error response determination unit determines that the event not including the error response is returned from the DUT, the Bluetooth core specification version specifying unit specifies the Bluetooth core specification version of the command packet of the returned event not including the error response, as the Bluetooth core specification version supported by the DUT.

With this configuration, the measurement apparatus according to the first aspect of the present invention automatically specifies the Bluetooth core specification version supported by the DUT, so that a user himself or herself does not need to check the Bluetooth core specification version supported by the DUT in advance, and user convenience is improved. That is, the measurement apparatus according to the first aspect of the present invention can easily perform measurement on the DUT by using the command packet corresponding to the automatically specified Bluetooth core specification version.

In addition, according to a second aspect of the present invention, the measurement apparatus of the first aspect may further include an event determination unit that determines whether or not in response to the command packet transmitted from the command packet transmission and reception unit to the DUT, the event is returned from the DUT within a predetermined time, in which in a case where the event determination unit determines that the event is returned from the DUT within the predetermined time, the error response determination unit may determine whether or not an error response is included in the event.

In addition, according to a third aspect of the present invention, in the measurement apparatus of the second aspect, in a case where the event determination unit determines that the event is not returned from the DUT within the predetermined time, the command packet transmission and reception unit may further transmit a command packet corresponding to the next lower Bluetooth core specification version than the command packet of the not-returned event, to the DUT.

In addition, according to a fourth aspect of the present invention, in the measurement apparatus of the first aspect, the command packet may include a test command of a test command version corresponding to any one of the plurality of Bluetooth core specification versions or a test command to which a parameter group corresponding to any one of the plurality of Bluetooth core specification versions is added.

According to a fifth aspect of the present invention, in the measurement apparatus of the second aspect, the command packet may include a test command of a test command version corresponding to any one of the plurality of Bluetooth core specification versions or a test command to which a parameter group corresponding to any one of the plurality of Bluetooth core specification versions is added.

According to a sixth aspect of the present invention, in the measurement apparatus of the third aspect, the command packet may include a test command of a test command version corresponding to any one of the plurality of Bluetooth core specification versions or a test command to which a parameter group corresponding to any one of the plurality of Bluetooth core specification versions is added.

With this configuration, the measurement apparatus of the fourth to sixth aspects of the present embodiment can measure the transmission and reception characteristic of the DUT in accordance with both the HCI command and the direct test mode.

In addition, according to a seventh aspect of the present invention, in the measurement apparatus of the first aspect, the Bluetooth core specification version may be any one of Bluetooth 4.0, 4.1, 4.2, 5.0, and 5.1. Further, in a case where a new Bluetooth core specification is formulated, the Bluetooth core specification version can be added.

In addition, according to an eighth aspect of the present invention, in the measurement apparatus of the seventh aspect, the command packet transmission and reception unit includes a 4.x command packet transmission and reception unit that transmits a command packet corresponding to any one of Bluetooth 4.0, 4.1, and 4.2 to the DUT, and receives the event from the DUT, a 5.0 command packet transmission and reception unit that transmits a command packet corresponding to Bluetooth 5.0 to the DUT, and receives the event from the DUT, and a 5.1 command packet transmission and reception unit that transmits a command packet corresponding to Bluetooth 5.1 to the DUT, and receives the event from the DUT.

In addition, according to a ninth aspect of the present invention, in the measurement apparatus of the fourth aspect, the Bluetooth core specification version may be any one of Bluetooth 4.0, 4.1, 4.2, 5.0, and 5.1. Further, in a case where a new Bluetooth core specification is formulated, the Bluetooth core specification version can be added.

In addition, according to a tenth aspect of the present invention, in the measurement apparatus of the ninth aspect, the command packet transmission and reception unit includes a 4.x command packet transmission and reception unit that transmits a command packet corresponding to any one of Bluetooth 4.0, 4.1, and 4.2 to the DUT, and receives the event from the DUT, a 5.0 command packet transmission and reception unit that transmits a command packet corresponding to Bluetooth 5.0 to the DUT, and receives the event from the DUT, and a 5.1 command packet transmission and reception unit that transmits a command packet corresponding to Bluetooth 5.1 to the DUT, and receives the event from the DUT.

In addition, according to an eleventh aspect of the present invention, there is provided a measurement method of measuring a transmission and reception characteristic of a device under test (DUT), the method including: a Bluetooth core specification version selection step of selecting any one of a plurality of Bluetooth (registered trademark) core specification versions; a command packet transmission step of transmitting a command packet of the Bluetooth core specification version selected in the Bluetooth core specification version selection step to the DUT; an error response determination step of determining whether or not an event received from the DUT includes an error response; a Bluetooth core specification version specifying step of specifying a Bluetooth core specification version supported by the DUT based on a determination result in the error response determination step; and a measurement execution step of measuring, in a case where a command packet corresponding to the Bluetooth core specification version specified in the Bluetooth core specification version specifying step is transmitted to the DUT, an RF signal transmitted and received by the DUT to measure a transmission and reception characteristic of the DUT, in which the error response indicates that the command packet transmitted in the command packet transmission step is a command packet which does not correspond to the Bluetooth core specification version supported by the DUT, in the command packet transmission step, a command packet corresponding to a highest Bluetooth core specification version among the plurality of Bluetooth core specification versions is transmitted to the DUT, at the time of measurement start, in a case where it is determined that the event including the error response is returned from the DUT in the error response determination step, in the command packet transmission step, a command packet corresponding to the next lower Bluetooth core specification version than the command packet of the returned event including the error response is further transmitted to the DUT, and in a case where it is determined that the event not including the error response is returned from the DUT in the error response determination step, in the Bluetooth core specification version specifying step, the Bluetooth core specification version of the command packet of the returned event not including the error response is specified as the Bluetooth core specification version supported by the DUT.

With this configuration, the measurement method according to the eleventh aspect of the present invention automatically specifies the Bluetooth core specification version supported by the DUT, so that a user himself or herself does not need to check the Bluetooth core specification version supported by the DUT in advance, and user convenience is improved. That is, the measurement method according to the eleventh aspect of the present invention can easily perform measurement on the DUT by using the command packet corresponding to the automatically specified Bluetooth core specification version.

In addition, according to a twelfth aspect of the present invention, the measurement method of the eleventh aspect may further include: an event determination step of determining whether or not in response to the command packet transmitted to the DUT in the command packet transmission step, the event indicating that the command packet is received by the DUT is returned from the DUT within a predetermined time, in which in a case where it is determined that the event is returned from the DUT within the predetermined time in the event determination step, in the error response determination step, it may be determined whether or not an error response is included in the event.

In addition, according to a thirteenth aspect of the present invention, in the measurement method of the twelfth aspect, in a case where it is determined that the event is returned from the DUT within the predetermined time in the event determination step, in the command packet transmission step, a command packet corresponding to the next lower Bluetooth core specification version than the command packet of the not-returned event may be further transmitted to the DUT.

In addition, according to a fourteenth aspect of the present invention, in the measurement method of the eleventh aspect, the command packet may include a test command of a test command version corresponding to any one of the plurality of Bluetooth core specification versions or a test command to which a parameter group corresponding to any one of the plurality of Bluetooth core specification versions is added. According to a fifth aspect of the present invention, in the measurement method of the twelfth aspect, the command packet may include a test command of a test command version corresponding to any one of the plurality of Bluetooth core specification versions or a test command to which a parameter group corresponding to any one of the plurality of Bluetooth core specification versions is added. According to a sixth aspect of the present invention, in the measurement method of the thirteenth aspect, the command packet may include a test command of a test command version corresponding to any one of the plurality of Bluetooth core specification versions or a test command to which a parameter group corresponding to any one of the plurality of Bluetooth core specification versions is added.

With this configuration, the measurement method of the fourteenth to sixteenth aspects of the present embodiment can measure the transmission and reception characteristic of the DUT in accordance with both the HCI command and the direct test mode.

Advantage of the Invention

The present invention provides a measurement apparatus and a measurement method capable of automatically specifying a Bluetooth core specification version supported by a device under test (DUT) and easily performing measurement on the DUT by using a command packet corresponding to the specified Bluetooth core specification version.

BEST MODE FOR CARRYING OUT THE INVENTION

Hereinafter, embodiments a measurement apparatus and a measurement method according to the present invention will be described with reference to the drawings.

Figure 1:
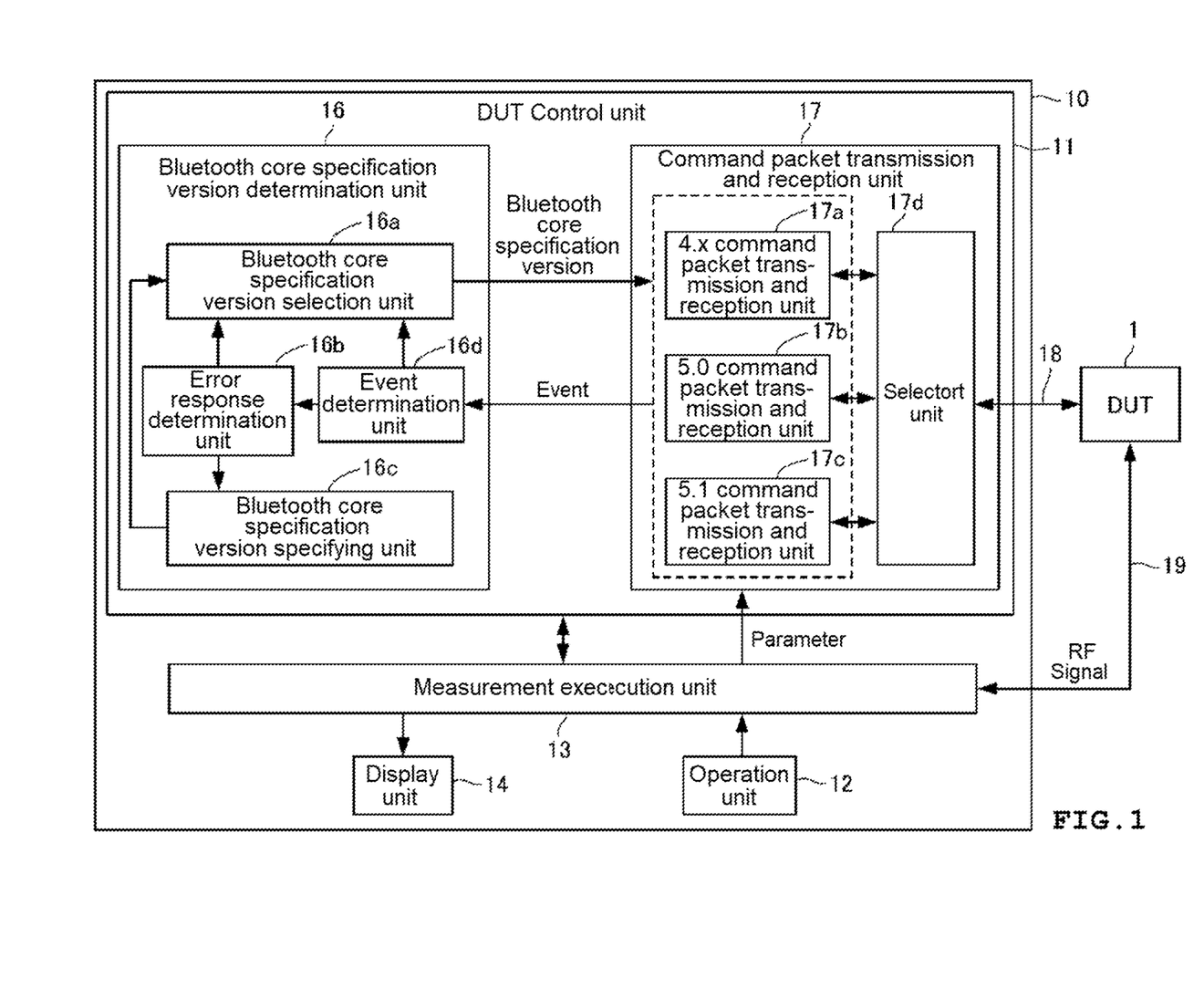
FIG. 1 is a block diagram illustrating a configuration of a measurement apparatus according to an embodiment of the present invention.

As illustrated in FIG. 1, a measurement apparatus 10 according to the embodiment of the present invention measures transmission and reception characteristics of a DUT 1 by performing wired communication or wireless communication with the DUT 1 as a device under test (DUT) corresponding to BLE. In general, the DUT 1 corresponds to either an HCI command or a direct test mode. In the following description, it is assumed that the measurement apparatus 10 communicates with the DUT 1 is performed mainly based on any one of Bluetooth core specification versions 4.x (4.0, 4.1, and 4.2), 5.0, and 5.1. The present invention is not limited to the above-described Bluetooth core specification version, and in a case where a new Bluetooth core specification version is formulated, the invention can be applied to the new Bluetooth core specification version.

In a case of receiving a command packet corresponding to Bluetooth core specification version supported by the DUT 1 from the measurement apparatus 10, the DUT 1 transmits and receives an RF signal to and from the measurement apparatus 10 in accordance with the received command packet. Further, in general, in a case of receiving a command packet not corresponding to Bluetooth core specification version supported by the DUT 1 from the measurement apparatus 10, the DUT 1 returns an error response to the measurement apparatus 10. A correspondence relationship between Bluetooth core specification version, a test command version, and a parameter group is as illustrated in FIGS. 5A and 5B.

For example, in a case where the DUT 1 corresponds to the HCI command, when receiving a command packet including a test command of a test command version corresponding to Bluetooth core specification version supported by the DUT 1 from the measurement apparatus 10, the DUT 1 transmits and receives an RF signal to and from the measurement apparatus 10 in accordance with the received command packet. In addition, in a case of receiving a command packet including a test command of a test command version not corresponding to Bluetooth core specification version supported by the DUT 1 from the measurement apparatus 10, the DUT 1 returns an error response to the measurement apparatus 10.

For example, in a case of receiving a command packet including a test command of any one of test command versions [v2] and [v3] from the measurement apparatus 10, the DUT 1 corresponding to Bluetooth core specification version 4.x returns an error response to the measurement apparatus 10. In a case of receiving a command packet including a test command of the test command version [v3] from the measurement apparatus 10, the DUT 1 corresponding to Bluetooth core specification version 5.0 returns an error response to the measurement apparatus 10. Even when receiving a command packet including a test command of at least the test command version [v3] from the measurement apparatus 10, the DUT 1 corresponding to Bluetooth core specification version 5.1 does not return an error response to the measurement apparatus 10.

On the other hand, in a case where the DUT 1 corresponds to the direct test mode, when receiving a command packet including a test command to which a parameter group corresponding to Bluetooth core specification version supported by the DUT 1 is added from the measurement apparatus 10, the DUT transmits and receives an RF signal to and from the measurement apparatus 10 in accordance with the received command packet. In addition, in a case of receiving a command packet including a test command to which a parameter group not corresponding to Bluetooth core specification version supported by the DUT 1 is added from the measurement apparatus 10, the DUT 1 returns an error response to the measurement apparatus 10.

For example, in a case of receiving a command packet including a test command to which at least one of the parameter groups B and C is added from the measurement apparatus 10, the DUT 1 corresponding to Bluetooth core specification version 4.x returns an error response to the measurement apparatus 10. In a case of receiving a command packet including a test command to which the parameter group C is added from the measurement apparatus 10, the DUT 1 corresponding to Bluetooth core specification version 5.0 returns an error response to the measurement apparatus 10. Even when receiving a command packet including a test command to which any or all of the parameter groups A, B, and C are added from the measurement apparatus 10, the DUT 1 corresponding to Bluetooth core specification version 5.1 does not return an error response to the measurement apparatus 10.

As illustrated in FIG. 1, the measurement apparatus 10 of the present embodiment includes a DUT control unit 11, an operation unit 12, a measurement execution unit 13, and a display unit 14. The DUT control unit 11 includes a Bluetooth core specification version determination unit 16 and a command packet transmission and reception unit 17. The command packet transmission and reception unit 17 of the DUT control unit 11 and the DUT 1 are connected via a control line 18. Further, the measurement execution unit 13 and the DUT 1 may be connected by wire via an RF cable 19, or may be wirelessly connected by using an antenna instead of the RF cable 19.

The command packet transmission and reception unit 17 establishes a communication connection with the DUT 1 based on a Bluetooth core specification. In addition, the command packet transmission and reception unit 17 is configured to transmit a command packet of Bluetooth core specification version selected by a Bluetooth core specification version selection unit 16a to be described below to the DUT 1, and receive an event indicating that the command packet is received by the DUT 1. As illustrated in FIG. 1, the command packet transmission and reception unit 17 includes a 4.x command packet transmission and reception unit 17a, a 5.0 command packet transmission and reception unit 17b, a 5.1 command packet transmission and reception unit 17c, and a selector unit 17d.

The 4.x command packet transmission and reception unit 17a is configured to transmit a command packet corresponding to any one of Bluetooth 4.0, 4.1, and 4.2 selected by Bluetooth core specification version selection unit 16a to be described below to the DUT 1, and receive an event from the DUT 1. The 4.x command packet transmission and reception unit 17a has a configuration for transmitting the command packet to the DUT 1, and includes a memory which stores a plurality of test commands or parameters of Bluetooth 4.x as digital data, a serial converter, and the like. Further, the 4.x command packet transmission and reception unit 17a includes a serial converter and the like as a configuration for receiving the event from the DUT 1.

The 5.0 command packet transmission and reception unit 17b is configured to transmit a command packet corresponding to Bluetooth 5.0 selected by Bluetooth core specification version selection unit 16a to be described below to the DUT 1, and receive an event from the DUT 1. The 5.0 command packet transmission and reception unit 17b has a configuration for transmitting the command packet to the DUT 1, and includes a memory which stores a plurality of test commands or parameters of Bluetooth 5.0 as digital data, a serial converter, and the like. Further, the 5.0 command packet transmission and reception unit 17b includes a serial converter and the like as a configuration for receiving the event from the DUT 1.

The 5.1 command packet transmission and reception unit 17c is configured to transmit a command packet corresponding to Bluetooth 5.1 selected by Bluetooth core specification version selection unit 16a to be described below to the DUT 1, and receive an event from the DUT 1. The 5.1 command packet transmission and reception unit 17c has a configuration for transmitting the command packet to the DUT 1, and includes a memory which stores a plurality of test commands or parameters of Bluetooth 5.1 as digital data, a serial converter, and the like. Further, the 5.1 command packet transmission and reception unit 17c includes a serial converter and the like as a configuration for receiving the event from the DUT 1.

The 4.x command packet transmission and reception unit 17a, the 5.0 command packet transmission and reception unit 17b, and the 5.1 command packet transmission and reception unit 17c may be respectively configured as separate hardware. Alternatively, the 4.x command packet transmission and reception unit 17a, the 5.0 command packet transmission and reception unit 17b, and the 5.1 command packet transmission and reception unit 17c may be configured by common hardware, and these functions may be switched in a software manner.

The selector unit 17d is configured to output a command packet input from any one of the 4.x command packet transmission and reception unit 17a, the 5.0 command packet transmission and reception unit 17b, and the 5.1 command packet transmission and reception unit 17c to the DUT 1 via the control line 18. Further, the selector unit 17d is configured to output an event input from the DUT 1 via the control line 18 to any one of the 4.x command packet transmission and reception unit 17a, the 5.0 command packet transmission and reception unit 17b, and the 5.1 command packet transmission and reception unit 17c.

As illustrated in FIG. 1, Bluetooth core specification version determination unit 16 includes Bluetooth core specification version selection unit 16a, an error response determination unit 16b, a Bluetooth core specification version specifying unit 16c, and an event determination unit 16d.

The Bluetooth core specification version selection unit 16a selects a Bluetooth core specification version of a command packet to be transmitted from the command packet transmission and reception unit 17 to the DUT 1 among a plurality of Bluetooth core specification versions 4.x, 5.0, and 5.1.

The event determination unit 16d determines whether or not an event is returned from the DUT 1 within a predetermined time (for example, 5 seconds) with respect to the command packet transmitted from the command packet transmission and reception unit 17.

The error response determination unit 16b determines whether or not an error response is included in the event in a case where the event determination unit 16d determines that the event is returned from the DUT 1 within the predetermined time. The error response indicates that the command packet transmitted from the command packet transmission and reception unit 17 is a command packet which does not correspond to a Bluetooth core specification version supported by the DUT 1.

The Bluetooth core specification version specifying unit 16c specifies a Bluetooth core specification version supported by the DUT 1 based on the determination result of the error response determination unit 16b. Specifically, in a case where the error response determination unit 16b determines that an event not including an error response is returned from the DUT 1, the Bluetooth core specification version specifying unit 16c specifies a Bluetooth core specification version of the command packet of the returned event not including the error response, as Bluetooth core specification version supported by the DUT 1. Further, the Bluetooth core specification version specifying unit 16c causes the Bluetooth core specification version selection unit 16a to select the specified Bluetooth core specification version, so that the command packet of the specified Bluetooth core specification version can be transmitted from the command packet transmission and reception unit 17 to the DUT 1.

The operation unit 12 is for receiving an operation input by a user, and is configured by a touch panel provided on a surface of a display screen of the display unit 14, for example. Alternatively, the operation unit 12 may be configured to include an input device such as a keyboard or a mouse. In addition, the operation unit 12 may be configured by an external control apparatus which performs remote control by using a remote command or the like. The operation input to the operation unit 12 is detected by the measurement execution unit 13. For example, by using the operation unit 12, the user can perform a setting of a parameter group supported by Bluetooth core specification version specified by the Bluetooth core specification version specifying unit 16c, a setting of a type of transmission and reception characteristic measurement to be executed by the measurement execution unit 13, or the like.

The measurement execution unit 13 causes the command packet transmission and reception unit 17 to transmit a command packet corresponding to Bluetooth core specification version specified by the Bluetooth core specification version specifying unit 16c to the DUT 1, and measures an RF signal transmitted and received by the DUT 1 to measure transmission and reception characteristics of the DUT 1. Here, when the transmission and reception characteristics are measured by the measurement execution unit 13, the command packet transmitted from the command packet transmission and reception unit 17 is based on various parameters set by the operation unit 12. In the measurement of the transmission characteristics of the DUT 1, the measurement execution unit 13 can measure, for example, transmission power, modulation characteristics, and the like. Further, the measurement execution unit 13 can measure, for example, a reception sensitivity, a bit error rate, a packet error rate, and the like in the measurement of the reception characteristics of the DUT 1.

The measurement execution unit 13 is configured by a microcomputer or a personal computer including a CPU, a ROM, a RAM, an HDD, and the like, for example, and controls an operation of each unit constituting the measurement apparatus 10. In addition, the measurement execution unit 13 transfers a predetermined program stored in the ROM and the like into the RAM and execute the program, so that at least a part of the measurement execution unit 13 and the Bluetooth core specification version determination unit 16 can be configured as software. At least a part of the measurement execution unit 13 and the Bluetooth core specification version determination unit 16 can be configured by a digital circuit such as a field programmable gate array (FPGA), an application specific integrated circuit (ASIC), or the like. Alternatively, at least a part of the measurement execution unit 13 and the Bluetooth core specification version determination unit 16 can be configured by appropriately combining a hardware process by the digital circuit and a software process by the predetermined program.

The display unit 14 is configured by a display device such as an LCD or a CRT, and according to a control signal output from the measurement execution unit 13, various display contents such as Bluetooth core specification version supported by the DUT 1, the measurement result of the transmission and reception characteristics of the DUT 1 by the measurement execution unit 13 are displayed. Further, the display unit 14 displays operation targets such as buttons, soft keys, pull-down menus, and text boxes for setting various parameters supported by each Bluetooth core specification version.

Figure 2:
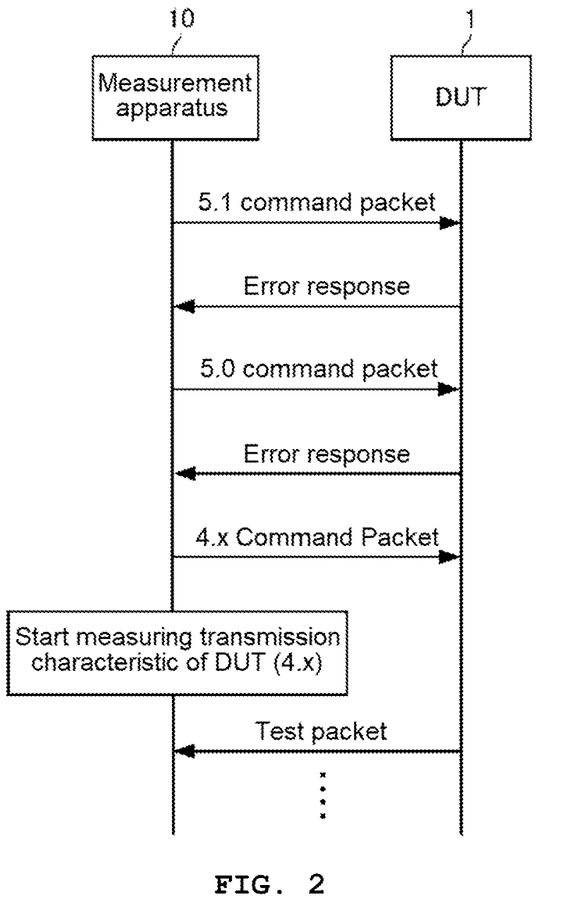
FIG. 2 is a sequence diagram for explaining a process in a case where a measurement execution unit of the measurement apparatus according to the embodiment of the present invention measures a transmission characteristic of a DUT.

Hereinafter, an example of a process in a case where the measurement execution unit 13 measures the transmission characteristics of the DUT 1 will be described with reference to FIG. 2. Here, it is assumed that the DUT 1 supports only Bluetooth core specification version 4.x.

<Case where DUT 1 Corresponds to HCI Command>

The Bluetooth core specification version selection unit 16a first selects the highest Bluetooth core specification version 5.1 among the plurality of Bluetooth core specification versions. Accordingly, the 5.1 command packet transmission and reception unit 17c of the command packet transmission and reception unit 17 transmits a command packet of the test command version [v3] to the DUT 1.

When receiving the command packet of the test command version [v3], the DUT 1 transmits an event including an error response to the command packet transmission and reception unit 17 of the measurement apparatus 10. The 5.1 command packet transmission and reception unit 17c receives the event including the error response, and outputs the event to the Bluetooth core specification version determination unit 16.

In a case where the error response determination unit 16b determines that the event including the error response is returned from the DUT 1, the Bluetooth core specification version selection unit 16a selects the next lower Bluetooth core specification version 5.0 than the command packet (the test command version [v3]) of the returned event including the error response. Accordingly, the 5.0 command packet transmission and reception unit 17b of the command packet transmission and reception unit 17 transmits a command packet of the test command version [v2] to the DUT 1.

When receiving the command packet of the test command version [v2], the DUT 1 transmits an event including an error response to the command packet transmission and reception unit 17 of the measurement apparatus 10. The 5.0 command packet transmission and reception unit 17b receives the event including the error response, and outputs the event to the Bluetooth core specification version determination unit 16.

In a case where the error response determination unit 16b determines that the event including the error response is returned from the DUT 1, the Bluetooth core specification version selection unit 16a selects the next lower Bluetooth core specification version 4.x than the command packet (the test command version [v2]) of the returned event including the error response. Accordingly, the 4.x command packet transmission and reception unit 17a of the command packet transmission and reception unit 17 transmits a command packet of the test command version [v1] to the DUT 1.

In a case where the error response determination unit 16b determines that an event not including an error response is returned from the DUT 1, the Bluetooth core specification version specifying unit 16c specifies Bluetooth core specification version 4.x of the command packet of the returned event not including the error response, as Bluetooth core specification version supported by the DUT 1.

The measurement execution unit 13 starts measuring transmission characteristics of an RF signal of a test packet transmitted from the DUT 1 thereafter.

<Case where DUT 1 Corresponds to Direct Test Mode>

The Bluetooth core specification version selection unit 16a first selects the highest Bluetooth core specification version 5.1 among the plurality of Bluetooth core specification versions. Accordingly, the 5.1 command packet transmission and reception unit 17c of the command packet transmission and reception unit 17 transmits a command packet including at least the parameter group C to the DUT 1.

When receiving the command packet including the parameter group C, the DUT 1 transmits an event including an error response to the command packet transmission and reception unit 17 of the measurement apparatus 10. The 5.1 command packet transmission and reception unit 17c receives the event including the error response, and outputs the event to the Bluetooth core specification version determination unit 16.

In a case where the error response determination unit 16b determines that the event including the error response is returned from the DUT 1, the Bluetooth core specification version selection unit 16a selects the next lower Bluetooth core specification version 5.0 than the command packet (Bluetooth core specification version 5.1) of the returned event including the error response. Accordingly, the 5.0 command packet transmission and reception unit 17b of the command packet transmission and reception unit 17 transmits a command packet including at least the parameter group B to the DUT 1.

When receiving the command packet including the parameter group B, the DUT 1 transmits an event including an error response to the command packet transmission and reception unit 17 of the measurement apparatus 10. The 5.0 command packet transmission and reception unit 17b receives the event including the error response, and outputs the event to the Bluetooth core specification version determination unit 16.

In a case where the error response determination unit 16b determines that the event including the error response is returned from the DUT 1, the Bluetooth core specification version selection unit 16a selects the next lower Bluetooth core specification version 4.x than the command packet (Bluetooth core specification version 5.0) of the returned event including the error response. Accordingly, the 4.x command packet transmission and reception unit 17a of the command packet transmission and reception unit 17 transmits a command packet to which the parameter group A is added to the DUT 1.

In a case where the error response determination unit 16b determines that an event not including an error response is returned from the DUT 1, the Bluetooth core specification version specifying unit 16c specifies Bluetooth core specification version 4.x of the command packet of the returned event not including the error response, as Bluetooth core specification version supported by the DUT 1.

The measurement execution unit 13 starts measuring transmission characteristics of an RF signal of a test packet transmitted from the DUT 1 thereafter.

Figure 3:
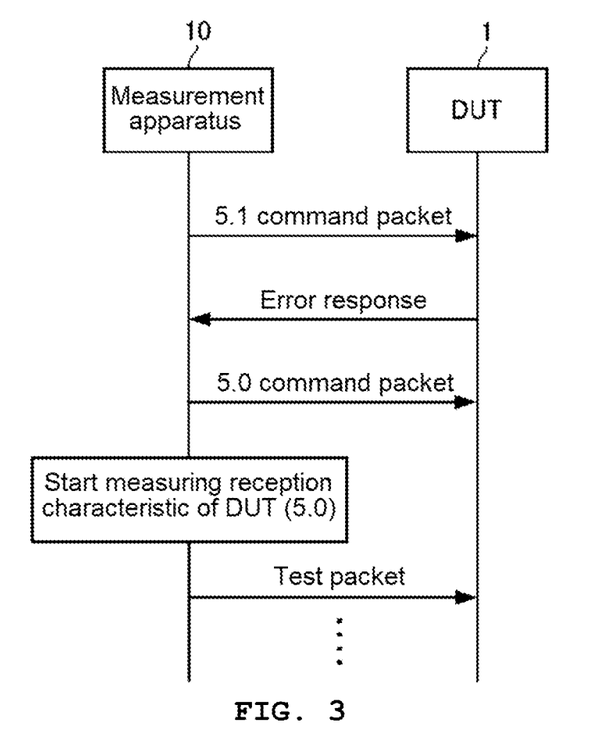
FIG. 3 is a sequence diagram for explaining a process in a case where a measurement execution unit of the measurement apparatus according to the embodiment of the present invention measures a reception characteristic of a DUT.

Hereinafter, an example of a process in a case where the measurement execution unit 13 measures the reception characteristics of the DUT 1 will be described with reference to FIG. 3. Here, it is assumed that the DUT 1 supports only Bluetooth core specification version 5.0.

<Case where DUT 1 Corresponds to HCI Command>

The Bluetooth core specification version selection unit 16a first selects the highest Bluetooth core specification version 5.1 among the plurality of Bluetooth core specification versions. Accordingly, the 5.1 command packet transmission and reception unit 17c of the command packet transmission and reception unit 17 transmits a command packet of the test command version [v3] to the DUT 1.

When receiving the command packet of the test command version [v3], the DUT 1 transmits an event including an error response to the command packet transmission and reception unit 17 of the measurement apparatus 10. The 5.1 command packet transmission and reception unit 17c receives the event including the error response, and outputs the event to the Bluetooth core specification version determination unit 16.

In a case where the error response determination unit 16b determines that the event including the error response is returned from the DUT 1, the Bluetooth core specification version selection unit 16a selects the next lower Bluetooth core specification version 5.0 than the command packet (the test command version [v3]) of the returned event including the error response. Accordingly, the 5.0 command packet transmission and reception unit 17b of the command packet transmission and reception unit 17 transmits a command packet of the test command version [v2] to the DUT 1.

In a case where the error response determination unit 16b determines that an event not including an error response is returned from the DUT 1, the Bluetooth core specification version specifying unit 16c specifies Bluetooth core specification version 5.0 of the command packet of the returned event not including the error response, as Bluetooth core specification version supported by the DUT 1.

The measurement execution unit 13 transmits an RF signal of a test packet to the DUT 1, and starts measuring reception characteristics.

<Case where DUT 1 Corresponds to Direct Test Mode>

The Bluetooth core specification version selection unit 16a first selects the highest Bluetooth core specification version 5.1 among the plurality of Bluetooth core specification versions. Accordingly, the 5.1 command packet transmission and reception unit 17c of the command packet transmission and reception unit 17 transmits a command packet including at least the parameter group C to the DUT 1.

When receiving the command packet including the parameter group C, the DUT 1 transmits an event including an error response to the command packet transmission and reception unit 17 of the measurement apparatus 10. The 5.1 command packet transmission and reception unit 17c receives the event including the error response, and outputs the event to the Bluetooth core specification version determination unit 16.

In a case where the error response determination unit 16b determines that the event including the error response is returned from the DUT 1, the Bluetooth core specification version selection unit 16a selects the next lower Bluetooth core specification version 5.0 than the command packet (Bluetooth core specification version 5.1) of the returned event including the error response. Accordingly, the 5.0 command packet transmission and reception unit 17b of the command packet transmission and reception unit 17 transmits a command packet including at least the parameter group B to the DUT 1.

In a case where the error response determination unit 16b determines that an event not including an error response is returned from the DUT 1, the Bluetooth core specification version specifying unit 16c specifies Bluetooth core specification version 5.0 of the command packet of the returned event not including the error response, as Bluetooth core specification version supported by the DUT 1.

The measurement execution unit 13 transmits an RF signal of a test packet to the DUT 1, and starts measuring reception characteristics.

Figure 4:
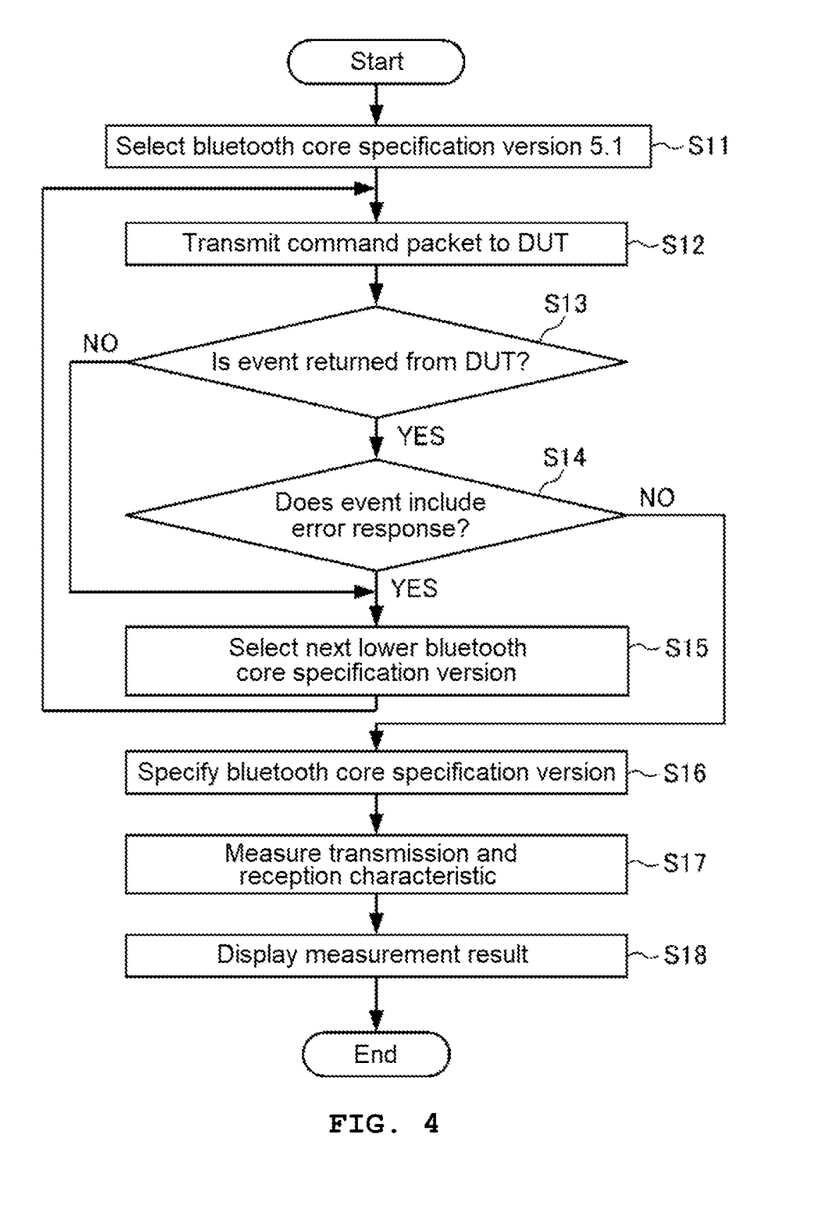
FIG. 4 is a flowchart illustrating a process of a measurement method using the measurement apparatus according to the embodiment of the present invention.

Among various Bluetooth devices, there are rarely devices (referred to as incomplete devices) which do not return an event itself in a case of receiving a command packet not corresponding to a Bluetooth core specification version supported by itself. In order to cope with such an incomplete device, in a case where the event determination unit 16d determines that an event is not returned from the DUT 1 within a predetermined time, the command packet transmission and reception unit 17 may transmit a command packet corresponding to the next lower Bluetooth core specification version than the command packet of which the event is not returned to the DUT 1. In other words, when the device does not correspond to the incomplete device, the event determination unit 16d (step S13 to be described below) may not be provided.

Hereinafter, an example of a process of a measurement method using the measurement apparatus 10 of the present embodiment will be described with reference to the flowchart of FIG. 4.

First, the Bluetooth core specification version selection unit 16a selects the highest Bluetooth core specification version 5.1 among the plurality of Bluetooth core specification versions (Bluetooth core specification version selection step S11).

Next, the command packet transmission and reception unit 17 transmits a command packet of Bluetooth core specification version selected in step S11 or step S15 to be described below to the DUT 1 (command packet transmission step S12).

Next, in response to the command packet transmitted from the command packet transmission and reception unit 17 in step S12, the event determination unit 16d determines whether or not an event indicating that the command packet is received by the DUT 1 is returned from the DUT 1 within a predetermined time (event determination step S13).

In step S13, in a case where it is not determined that the event is returned from the DUT 1 even after the predetermined time elapses, the measurement execution unit 13 proceeds to the process in step S15.

On the other hand, in a case where it is determined that the event is returned from the DUT 1 within the predetermined time in step S13, it is determined whether the event includes an error response (error response determination step S14).

In step S14, in a case where it is not determined that the event returned from the DUT 1 includes the error response (in other words, the event indicating that the DUT 1 normally receives the command packet of Bluetooth core specification version supported by the DUT 1 is returned), the measurement execution unit 13 proceeds to the process in step S16.

On the other hand, in a case where it is determined that the event returned from the DUT 1 includes the error response in step S14, the Bluetooth core specification version selection unit 16a selects the next lower Bluetooth core specification version than the command packet of the returned event including the error response (Bluetooth core specification version selection step S15). The measurement execution unit 13 returns to the process in step S12, and causes the command packet transmission and reception unit 17 to transmit a command packet of Bluetooth core specification version selected in step S15 to the DUT 1.

Further, in step S13, even in a case where it is not determined that the event is returned from the DUT 1 even after the predetermined time elapses, the Bluetooth core specification version selection unit 16*a* selects the next lower Bluetooth core specification version than the command packet of which the event is not returned (Bluetooth core specification version selection step S15). The measurement execution unit 13 returns to the process in step S12, and causes the command packet transmission and reception unit 17 to transmit a command packet of Bluetooth core specification version selected in step S15 to the DUT 1.

In a case where the DUT 1 is a non-standard product which does not return an event in any case, the processes in steps S12 to S15 are repeated, and finally, the Bluetooth core specification version selection unit 16*a* is in a state in which the lower Bluetooth core specification version than the lowest Bluetooth core specification version cannot be selected. In such a case, the measurement execution unit 13 may cause the display unit 14 to display a message or the like notifying the user that the DUT 1 is a non-standard product.

In step S16, the Bluetooth core specification version specifying unit 16*c* specifies Bluetooth core specification version of the command packet of which the event not including the error response is determined to be returned from the DUT 1 in step S14, as Bluetooth core specification version supported by the DUT 1 (Bluetooth core specification version specifying step S16). In the above process, the command packet corresponding to Bluetooth core specification version specified in the Bluetooth core specification version specifying step S16 is transmitted to the DUT 1.

The measurement execution unit 13 measures an RF signal transmitted and received by the DUT 1 which receives a command packet corresponding to Bluetooth core specification version specified in the Bluetooth core specification version specifying step S16 to measure transmission and reception characteristics of the DUT 1 (measurement execution step S17).

Next, the display unit 14 displays the measurement result measured by the measurement execution unit 13 on a screen (step S18).

As described above, the measurement apparatus 10 according to the present embodiment transmits the command packet of Bluetooth core specification versions 5.1→5.0→4.x to the DUT 1 in this order, and when an event not including an error response is returned from the DUT 1, a Bluetooth core specification version corresponding to the DUT 1 is specified. After that, the measurement apparatus 10 causes the DUT 1 to transmit or receive an RF signal while controlling the DUT 1 by using the command packet of Bluetooth core specification version. In this manner, the measurement apparatus 10 according to the present embodiment automatically specifies Bluetooth core specification version supported by the DUT 1, so that the user himself or herself does not need to check Bluetooth core specification version supported by the DUT 1 in advance, and user convenience is improved. That is, the measurement apparatus 10 according to the present embodiment can easily perform measurement on the DUT 1 by using the command packet corresponding to the automatically specified Bluetooth core specification version.

In addition, since the measurement apparatus 10 according to the present embodiment specifies Bluetooth core specification version corresponding to the DUT 1, all parameters to be set in Bluetooth core specification version can be specified, and omission of parameter setting can be eliminated.

Further, the measurement apparatus 10 according to the present embodiment can measure the transmission and reception characteristics of the DUT 1 in accordance with both the HCI command and the direct test mode.

The present invention is not limited to the above-described Bluetooth core specification version, and in a case where a new Bluetooth core specification version is formulated, the invention can be applied to the new Bluetooth core specification version.

DESCRIPTION OF REFERENCE NUMERALS AND SIGNS

1 DUT
10 measurement apparatus
11 DUT control unit
12 operation unit
13 measurement execution unit
14 display unit
16 Bluetooth core specification version determination unit
16*a* Bluetooth core specification version selection unit
16*b* error response determination unit
16*c* Bluetooth core specification version specifying unit
16*d* event determination unit
17 command packet transmission and reception unit
17*a* 4.x command packet transmission and reception unit
17*b* 5.0 command packet transmission and reception unit
17*c* 5.1 command packet transmission and reception unit
17*d* selector unit
18 control line
19 RF cable

What is claimed is:

1. A measurement apparatus including a command packet transmission and reception unit that transmits a command packet corresponding to any one of a plurality of Bluetooth (registered trademark) core specification versions to a device under test (DUT) and receives an event indicating that the command packet is received from the DUT and measuring a transmission and reception characteristic of the DUT, the apparatus comprising:
   an error response determination unit that determines whether or not the event received from the DUT includes an error response;
   a Bluetooth core specification version specifying unit that specifies a Bluetooth core specification version supported by the DUT based on a determination result of the error response determination unit; and
   a measurement execution unit that causes the command packet transmission and reception unit to transmit a command packet corresponding to the Bluetooth core specification version specified by the Bluetooth core specification version specifying unit to the DUT, and measures an RF signal transmitted and received by the DUT to measure a transmission and reception characteristic of the DUT,
   wherein the error response indicates that the command packet transmitted from the command packet transmission and reception unit is a command packet which does not correspond to the Bluetooth core specification version supported by the DUT,
   the command packet transmission and reception unit transmits a command packet corresponding to a highest Bluetooth core specification version among the plurality of Bluetooth core specification versions to the DUT, at the time of measurement start, in a case where the error response determination unit determines that the event including the error response is returned from the DUT, the command packet transmission and reception unit further transmits a command packet corresponding to the next lower Bluetooth core specification version than the command packet of the returned event including the error response to the DUT, and in a case where the error response determination unit determines that the event not including the error response is returned from the DUT, the Bluetooth core specification version specifying unit specifies the Bluetooth core specification version of the command packet of the returned event not including the error response, as the Bluetooth core specification version supported by the DUT.

2. The measurement apparatus according to claim 1, further comprising:

an event determination unit that determines whether or not, in response to the command packet transmitted from the command packet transmission and reception unit to the DUT, the event is returned from the DUT within a predetermined time, wherein in a case where the event determination unit determines that the event is returned from the DUT within the predetermined time, the error response determination unit determines whether or not an error response is included in the event.

3. The measurement apparatus according to claim 2, wherein in a case where the event determination unit determines that the event is not returned from the DUT within the predetermined time, the command packet transmission and reception unit further transmits a command packet corresponding to the next lower Bluetooth core specification version than the command packet of the not-returned event, to the DUT.

4. The measurement apparatus according to claim 3, wherein the command packet includes a test command of a test command version corresponding to any one of the plurality of Bluetooth core specification versions or a test command to which a parameter group corresponding to any one of the plurality of Bluetooth core specification versions is added.

5. The measurement apparatus according to claim 2, wherein the command packet includes a test command of a test command version corresponding to any one of the plurality of Bluetooth core specification versions or a test command to which a parameter group corresponding to any one of the plurality of Bluetooth core specification versions is added.

6. The measurement apparatus according to claim 1, wherein the command packet includes a test command of a test command version corresponding to any one of the plurality of Bluetooth core specification versions or a test command to which a parameter group corresponding to any one of the plurality of Bluetooth core specification versions is added.

7. The measurement apparatus according to claim 6, wherein the Bluetooth core specification version is any one of Bluetooth 4.0, 4.1, 4.2, 5.0, and 5.1.

8. The measurement apparatus according to claim 7, wherein the command packet transmission and reception unit includes a 4.x command packet transmission and reception unit that transmits a command packet corresponding to any one of Bluetooth 4.0, 4.1, and 4.2 to the DUT, and receives the event from the DUT, a 5.0 command packet transmission and reception unit that transmits a command packet corresponding to Bluetooth 5.0 to the DUT, and receives the event from the DUT, and a 5.1 command packet transmission and reception unit that transmits a command packet corresponding to Bluetooth 5.1 to the DUT, and receives the event from the DUT.

9. The measurement apparatus according to claim 1, wherein the Bluetooth core specification version is any one of Bluetooth 4.0, 4.1, 4.2, 5.0, and 5.1.

10. The measurement apparatus according to claim 9, wherein the command packet transmission and reception unit includes a 4.x command packet transmission and reception unit that transmits a command packet corresponding to any one of Bluetooth 4.0, 4.1, and 4.2 to the DUT, and receives the event from the DUT, a 5.0 command packet transmission and reception unit that transmits a command packet corresponding to Bluetooth 5.0 to the DUT, and receives the event from the DUT, and a 5.1 command packet transmission and reception unit that transmits a command packet corresponding to Bluetooth 5.1 to the DUT, and receives the event from the DUT.

11. A measurement method of measuring a transmission and reception characteristic of a device under test (DUT), the method comprising:

a Bluetooth (registered trademark) core specification version selection step of selecting any one of a plurality of Bluetooth core specification versions;

a command packet transmission step of transmitting a command packet of the Bluetooth core specification version selected in the Bluetooth core specification version selection step to the DUT;

an error response determination step of determining whether or not an event received from the DUT includes an error response;

a Bluetooth core specification version specifying step of specifying a Bluetooth core specification version supported by the DUT based on a determination result in the error response determination step; and a measurement execution step of measuring, in a case where a command packet corresponding to the Bluetooth core specification version specified in the Bluetooth core specification version specifying step is transmitted to the DUT, an RF signal transmitted and received by the DUT to measure a transmission and reception characteristic of the DUT, wherein the error response indicates that the command packet transmitted in the command packet transmission step is a command packet which does not correspond to the Bluetooth core specification version supported by the DUT, in the command packet transmission step, a command packet corresponding to a highest Bluetooth core specification version among the plurality of Bluetooth core specification versions is transmitted to the DUT, at the time of measurement start, in a case where it is determined that the event including the error response is returned from the DUT in the error response determination step, in the command packet transmission step, a command packet corresponding to the next lower Bluetooth core specification version than the command packet of the returned event including the error response is further transmitted to the DUT, and in a case where it is determined that the event not including the error response is returned from the DUT in the error response determination step, in the Bluetooth core specification version specifying step, the Bluetooth core specification version of the command packet of the returned event not including the error response is specified as the Bluetooth core specification version supported by the DUT.

12. The measurement method according to claim 11, further comprising:

an event determination step of determining whether or not, in response to the command packet transmitted to the DUT in the command packet transmission step, the event indicating that the command packet is received by the DUT is returned from the DUT within a predetermined time, wherein in a case where it is determined that the event is returned from the DUT within the predetermined time in the event determination step, in the error response determination step, it is determined whether or not an error response is included in the event.

13. The measurement method according to claim 12, wherein in a case where it is determined that the event is not returned from the DUT within the predetermined time in the event determination step, in the command packet transmission step, a command packet corresponding to the next lower Bluetooth core specification version than the command packet of the not-returned event is further transmitted to the DUT.

14. The measurement method according to claim 13, wherein the command packet includes a test command of a test command version corresponding to any one of the plurality of Bluetooth core specification versions or a test command to which a parameter group corresponding to any one of the plurality of Bluetooth core specification versions is added.

15. The measurement method according to claim 12, wherein the command packet includes a test command of a test command version corresponding to any one of the plurality of Bluetooth core specification versions or a test command to which a parameter group corresponding to any one of the plurality of Bluetooth core specification versions is added.

16. The measurement method according to claim 11, wherein the command packet includes a test command of a test command version corresponding to any one of the plurality of Bluetooth core specification versions or a test command to which a parameter group corresponding to any one of the plurality of Bluetooth core specification versions is added.

* * * * *